No. 684,273. Patented Oct. 8, 1901.
W. W. LEAVENWORTH.
RUBBER TIRE.
(Application filed June 21, 1901.)
(No Model.)

Witnesses:
Henry L. Deck
F. F. Schyinger

W. W. Leavenworth, Inventor.
By Wilhelm Bonner
Attorneys.

UNITED STATES PATENT OFFICE.

WILLIAM W. LEAVENWORTH, OF BATAVIA, NEW YORK.

RUBBER TIRE.

SPECIFICATION forming part of Letters Patent No. 684,273, dated October 8, 1901.

Application filed June 21, 1901. Serial No. 65,412. (No model.)

*To all whom it may concern:*

Be it known that I, WILLIAM W. LEAVENWORTH, a citizen of the United States, and a resident of Batavia, in the county of Genesee and State of New York, have invented new and useful Improvements in Rubber Tires, of which the following is a specification.

This invention relates to that class of cushion rubber tires for vehicle-wheels which are secured in the channeled rim of the wheel by wires or bands embedded in the tire.

My invention has for its objects to prevent the longitudinal displacement or creeping of the tire in the channel and to hold the tire in the channel securely against lateral movement. The tendency to creep under the pressure to which the tire is exposed in use is greatest in the lowermost layer or portion of the tire which rests upon the bottom of the channeled rim. I overcome this tendency by so constructing the tire that the lowermost layer or portion of the tire can spread or expand laterally on the bottom of the channel, while the upper part of the base portion of the tire is firmly held against lateral movement between the side flanges of the rim.

Figure 1:
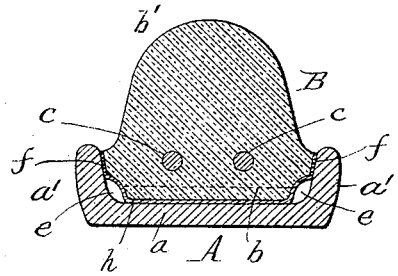
Figure 2:
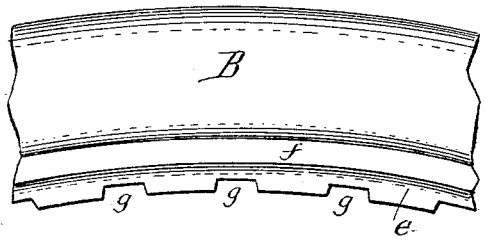
Figure 3:
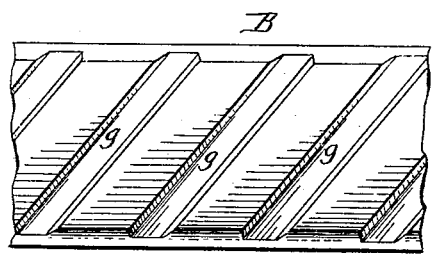
Figure 4:
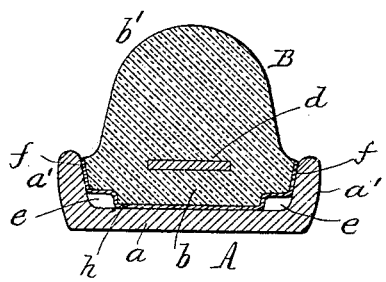
Figure 5:
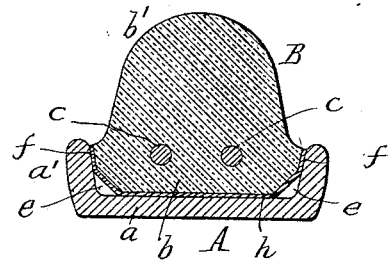

In the accompanying drawings, Figure 1 is a cross-section of my improved tire arranged in the channeled wheel-rim. Fig. 2 is a side elevation of a portion of the tire. Fig. 3 is a bottom plan view thereof. Figs. 4 and 5 are cross-sections showing slightly-modified forms of the tire.

Like letters of reference refer to like parts in the several figures.

A represents the channeled wheel-rim, constructed of steel or other suitable metal in the usual manner.

*a* represents the body or base, and *a'* the outwardly-diverging side flanges of the rim.

B represents the rubber tire, composed of a base portion *b*, which is arranged between the side flanges of the rim, and a tread portion *b'*, which is arranged outside of said flanges. The tire is secured in the rim in a well-known manner by wires *c*, as shown in Fig. 1, or by a band *d*, as shown in Fig. 4, or by other similar fastening devices embedded in the base portion *b* of the tire. The base of the tire is cut away at each corner, forming a recess *e* at each lower corner of the tire, whereby open spaces are formed between the base of the tire and the side flanges of the channeled rim at the junction of the flanges with the base of the rim. These corner-recesses are located below the level of the fastening wires or bands. In the use of the tire the pressure which is applied to the tread is transmitted from the latter to the bottom portion of the base and causes the latter to spread laterally. The open spaces at both ends of the base accommodate the rubber which is displaced by this pressure and allow the rubber to flow laterally, thereby preventing displacement or creeping in the longitudinal direction.

Each side of the base portion *b* of the tire is provided above the lower corner-recess *e* with a flat bearing-surface *f*, which is of considerable height or width vertically. These broad flat bearing-surfaces enable the tire to seat itself snugly between the side flanges of the channeled rim and support the tire firmly between the flanges against a pressure which tends to move the tire bodily to one side or the other. In turning the vehicle or in striking a stone the tire is often violently pressed sidewise against one of the side flanges of the channeled rim. The broad flat bearing-surfaces receive such lateral pressure and prevent lateral movement of the tire under these circumstances. In rubber-tired vehicles which are used on paved streets there is usually a constant lateral pressure exerted upon the tire by reason of the slope of the surface of the pavement from the center of the street toward the curb. This also tends to displace the tire laterally in the channel, and this tendency is effectually resisted by the broad flat bearing-surfaces above the corner-recesses. The corner-recesses may be variously shaped. In Fig. 1 their height is greater than their width and the recess is rounded. In Fig. 4 they are more angular and wider than high. In Fig. 5 the corners are beveled. In each case the tire is tightly drawn against the bottom and side flanges of the channeled rim by the internal fastening device and securely held in place in the channel, while the portions of the rubber which lie outside of the internal fastening device are free to expand laterally under pressure into the spaces formed in the corners of the channeled rim by the corner-recesses of the base of the tire.

The base of the tire is preferably provided below the flat bearing-surfaces with transverse grooves g, which are arranged obliquely to the sides of the tire in such manner that each groove has its end on one side of the tire extending circumferentially past the end of the next adjacent groove on the opposite side of the tire. The grooves increase the flexibility of the base of the tire and permit the tire to be more readily bent in placing it into the channeled rim. The oblique arrangement of the grooves insures a substantial support for the tread upon the bottom of the rim at every point of the tread circumferentially and equalizes the action of the tire, in which respect the arrangement differs from that in which the grooves are arranged at right angles to the side of the tire, whereby the tread is unsupported at intervals circumferentially and the action of the tread is different over the grooves from what it is over the deep parts of the tire.

The bottom surface of the tire is preferably reinforced by a covering h, of canvas, in the usual way.

I claim as my invention—

1. The combination with a channeled wheel-rim, of a rubber tire composed of a base portion and a tread portion and having its base portion provided with recesses at its lower corners and between said recesses with a flat base by which the tire bears against the channeled rim and above each recess and below the tread portion with a flat, broad bearing-surface by which the tire bears against the adjacent side flange of the rim, and an internal fastening means which is arranged within the base portion of the tire over the base bearing-surface between the recesses, whereby the tire is tightly drawn against the bottom and side flanges of the channeled rim, while the rubber outside of said internal fastening means is free to expand laterally into the corner-spaces formed by said recesses, substantially as set forth.

2. A rubber tire provided in its lower surface with transverse grooves arranged obliquely to the sides of the tire, substantially as set forth.

3. A rubber tire having its base portion provided with recesses at its lower corners and having the sides of the base portion provided above said recesses and below the tread with flat, broad bearing-surfaces and having its bottom provided with grooves arranged obliquely to the sides of the tire, substantially as set forth.

Witness my hand this 17th day of June, 1901.

WILLIAM W. LEAVENWORTH.

Witnesses:
EDWARD WILHELM,
C. B. HORNBECK.